Patented June 30, 1942

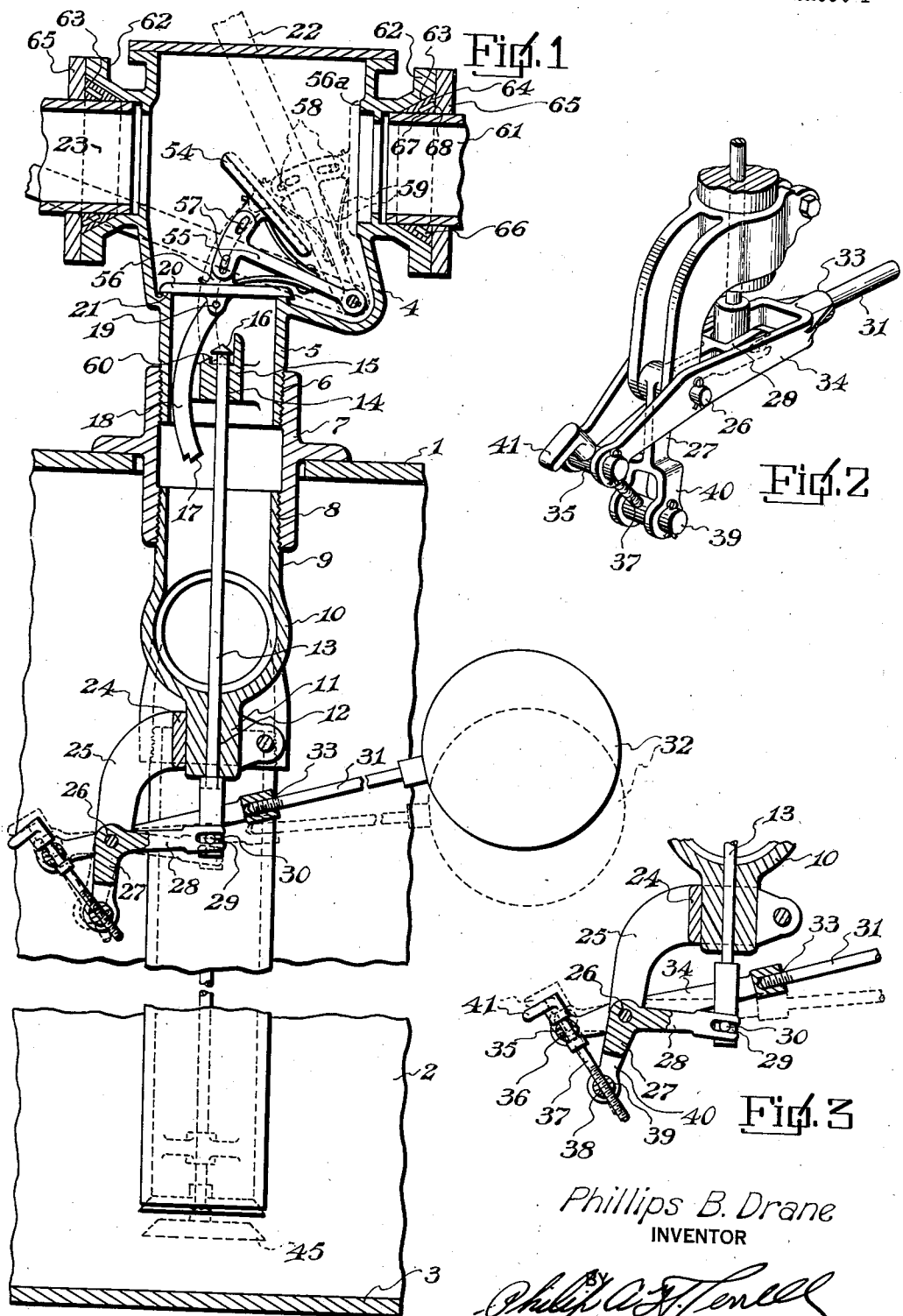

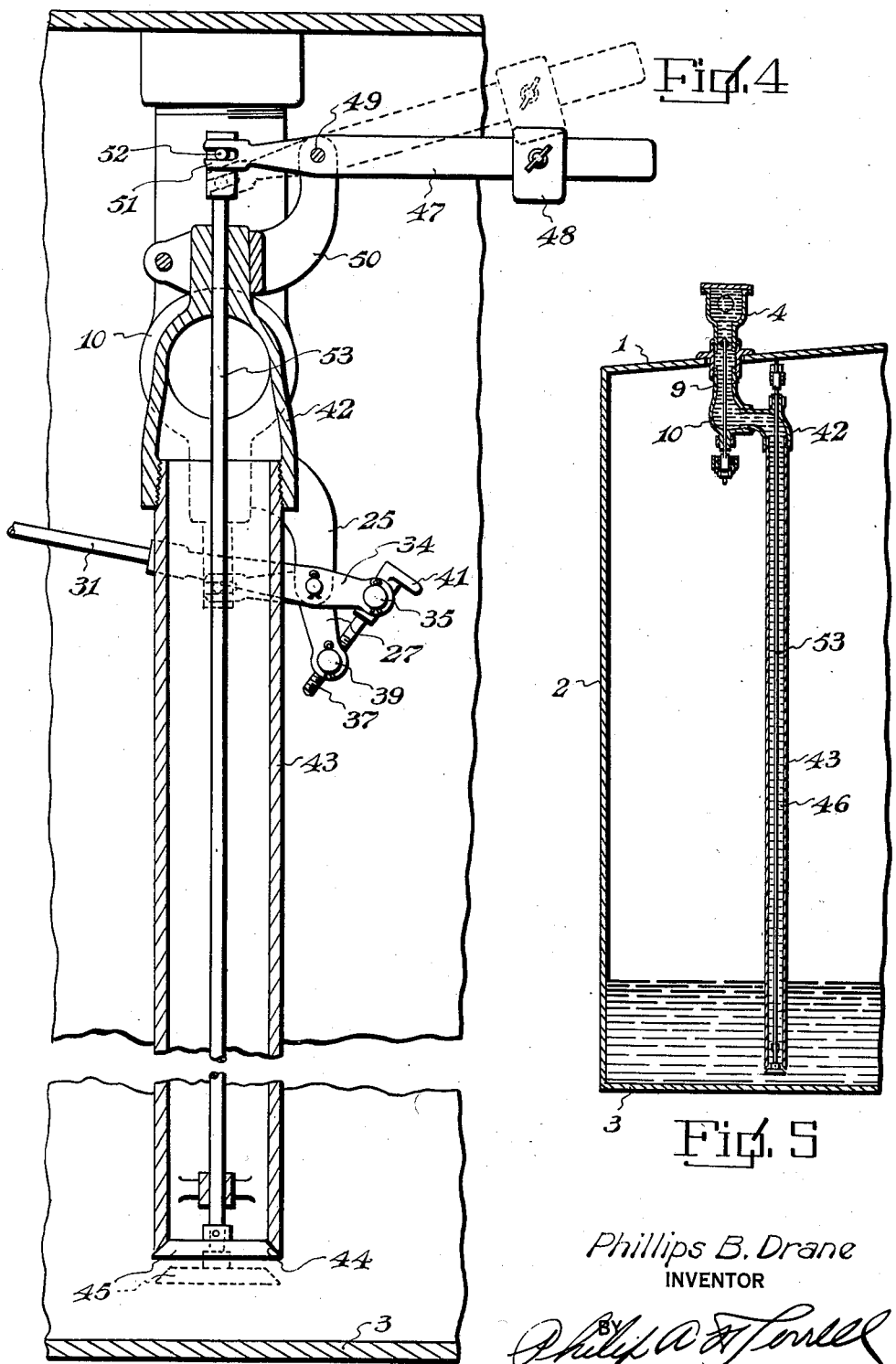

2,288,231

UNITED STATES PATENT OFFICE 2,288,231

DIVERTING VALVE FLOAT CONTROLLED MEANS

Phillips B. Drane, Tulsa, Okla.

Application August 7, 1940, Serial No. 351,680

2 Claims. (Cl. 137—68)

The invention relates to float control means for storage tank diverting valves wherein fluid is diverted from a main line into a tank by a diverting valve controlled by a trip rod, and has for its object to provide an adjustable float means within the tank, adjustable so the tripping operation may take place at a predetermined liquid level within the tank.

A further object is to provide a float control means for the trip rod comprising a bell crank lever having one of its ends connected to the trip rod or stem, and an adjusting screw connecting the other arm of the bell crank and the float arm so said float arm may be adjusted for the valve tripping operation according to the desired liquid level within the tank, and at the same time allowing the float arm to maintain the trip stem in inoperative position when the liquid level is below the predetermined desired level.

A further object is to provide rockably mounted shafts in the bell crank lever and the float arm, and to thread the adjusting screw through one of said rock shafts and to rotatably mount the adjusting screw in the other rock shaft so the float carried by the float arm may be adjusted upwardly or downwardly according to the direction of rotation of the adjusting screw.

A further object is to provide the upper end of the trip stem with a head or stop which engages a stationary stop and supports the float and float arm in adjusted position until the liquid within the tank reaches a predetermined level for raising the float.

A further object is to provide a fill-pipe extending downwardly into the tank, and having a counterweighted discharge valve for maintaining a column of fluid in the fill-pipe at all times, and particularly when the tank is substantially empty, thereby preventing the emulsifying of oil incident to the discharge of oil into the tank.

A further object is to terminate the fill-pipe adjacent the bottom of the tank and to provide a counterweight controlled valve at the bottom of the pipe and controlled from adjacent the top of the tank through the medium of a valve rod.

A further object is to provide a valve lever within a valve casing and having clapper valves loosely connected to opposite sides thereof and normally forced outwardly by spring means, said clapper valves cooperating with angularly disposed main and branch valve seats within the casing. The structure is a modification of the diverting valve shown in my application Ser. No. 321,304, filed February 28 1940, now Patent No. 2,244,986, granted June 10, 1941.

A further object is to provide the valve casing with flanged extensions having a frusto conically shaped flexible packing ring therein, provided with angular disposed metallic dies for biting into the periphery of pipe ends, and holding the pipe ends rigidly connected to the valve casing.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a vertical longitudinal sectional view through the diverting valve and float control means therefor, showing the float controlled means in tripping position in full line and in set position in dotted lines.

Figure 2 is a detail perspective view of the adjusting means for the float arm.

Figure 3 is a vertical longitudinal sectional view through the adjusting means for the float arm.

Figure 4 is a vertical transverse sectional view through the fill pipe, showing the counterweighted fill-pipe valve mechanism in closed and open position.

Figure 5 is a vertical longitudinal sectional view through the diverting valve mechanism and fill-pipe showing the fill-pipe valve in open position incident to the column of fluid and additional pressure during a tank filling operation.

Referring to the drawings, the numeral 1 designates the top of a conventional form of oil storage tank 2, and 3 the bottom of the tank. The diverting valve casing 4 is provided with a downwardly extending branch pipe 5, threaded at 6 into the upper end of the flanged coupling 7 carried by the top 1 of the tank. The lower end of the coupling 7 extends into the tank, and has threaded therein at 8 the upper end 9 of the L 10. Extending downwardly from the lower side of the L 10 is a lug 11, in a bearing 12 of which, the vertically movable trip rod 13 is axially movable. The upper end of the trip rod 13 is slidably mounted in a bearing 14 of a lug 15 within the branch pipe 5, and the stem terminates in a conically shaped valve trip head 16, adapted to engage the bevelled end 17 of the trip arm 18, hingedly connected at 19 to the clapper valve 20 for allowing the clapper valve 20 to seat on the valve seat 21, in other words, to move from the dotted line position shown in Figure 1 to the full line position shown in Figure 1, under the influence of the weight arm 22. This broad idea is set forth in my prior application above referred to.

It has been found desirable to provide means for cutting off the flow of oil from the supply pipe 23 when the liquid level reaches a predetermined point in the tank 2. In devices heretofore constructed no means has been provided for varying the tank level, and to obviate this difficulty an adjustable float means is provided.

Secured to the extension 11 by contractible collar 24 are outwardly and downwardly extending space arms 25 between which is rockably mounted on a pin 26 a bell crank 27. The arm 28 of the bell crank is bifurcated and has its arms slotted as at 29 for the reception of pins 30 carried by the lower end of the trip rod 13, therefore it will be seen that as the bell crank 27 is rocked the trip rod 13 will be moved upwardly or downwardly.

One end of the float arm 31 has mounted thereon a conventional form of float 32, and the other end is connected at 33 to the yoke 34. The yoke has its arms pivotally mounted on the outer ends of the pin 26 and extends outwardly, and connected together by a rock shaft 35. Rotatably mounted in a bearing 36 of the rock shaft 35 is an adjusting screw 37, which extends downwardly and inwardly and threaded at 38 through a rock shaft 39 in the bifurcated end of the bell crank arm 40, therefore it will be seen by adjusting the adjusting screw 37 the float arm and float can be adjusted upwardly or downwardly for actuation at a predetermined liquid level within the tank, and when the liquid level is below the float, the weight of the float and arm will maintain the trip rod head 16 on the top of the lug 15, and said head will support the mechanism until the liquid level reaches a point where the adjusting screw will rock the bell crank arm 40 inwardly, and the bell crank arm 28 upwardly for the tripping operation. Adjusting screw 37 is preferably provided with a hand engaging member 41 so it can be easily and quickly adjusted.

Connected to one side of the L 10 is a branch L 42, to which is connected a downwardly extending fill-pipe 43, which terminates adjacent the bottom 3 of the tank, shown in Figures 4 and 5. It has been found that oil pumped into a tank through fill-pipes causes oil to emulsify, incident to the drop and set up turbulences and bottom settlement. To overcome this difficulty the lower end of the fill-pipe 43 is provided with a valve seat 44, with which a disc valve 45 cooperates. Disc valve 45 is normally closed and traps a column of oil therein as shown at 46 in Figure 5 to overcome the turbulence when the oil is pumped into the tank. Disc valve is unseated immediately upon the application of pressure to the upper end of the column of oil, and immediately closes when this additional pumping pressure is relieved for again trapping a column of fluid. The above operation is accomplished through the medium of a counterweighted arm 47 having an adjustable counterweight 48 thereon. The arm 47 is pivotally mounted at 49 to a bracket 50 carried by the upper side of the L 42, and is provided with bifurcations 51 which engage pins 52 carried by the upper end of the valve rod 53. Valve rod 53 extends downwardly through the L 42 and fill-pipe 43 and carries, at its lower end, the disc valve 45. It will be noted that by adjusting the counterweight 48 on the lever 47, a fine adjustment may be obtained so the disc valve 45 will be maintained closed against the weight of the column of fluid in the pipe 43 and the valve stem 53 so the additional pressure, during a filling operation, will open the valve 45 and allow the valve 45 to close upon relief of the additional pressure.

It will be noted the clapper valves 20 and 54 are carried by a single hingedly mounted arm 55. The clapper valve 20 and 54 are provided with arms 56 having pins 57 extending into elongated slots 58 in the free end of the arm 55 and said clapper valves are normally forced outwardly by means of leaf springs 59, carried by opposite sides of the arm 55. The leaf springs insure the absorption of the shock when the clapper valves engage either the seat 21 or seat $56^a$. When it is desired to divert fluid into the tank from the main line 23 the weight lever 22 is raised to the dotted line position shown in Figure 1, and the pressure in the supply line will help to maintain the valve seated at $56^a$, however the trip arm 18 will engage over the shoulder 60 for holding the valve 20 open. This action will be assisted by the leaf springs. At this particular period the tank is below level and the float 32 is in the dotted line position shown in Figure 1, however when the float is raised, the fluid trip rod 13 is forced upwardly and the head 16 forces the free end of the lever 18 outwardly, thereby allowing the clapper valve 20 to seat at 21 under the influence of the weight arm 22 for cutting off the tank and allowing the fluid from the main line to continue through the pipe 61 to the next tank to be filled.

Opposite sides of the casing 4 of the diverting valve are provided with flanged extensions 62 having a frusto conically shaped packing seat 63 therein for the reception of the yieldable packings 64, which are forced into the seats by means of flanges 65 at each side of the casing. Embedded in the packing rings are angularly disposed dies 66, which have sharpened corners 67 and 68. The sharpened corners 67 bite into the peripheries of the pipe ends 23 and 61 incident to the tightening of the flanges 65, therefore it will be seen that the pipe ends are positively held against outward movement incident to expansion and contraction.

From the above it will be seen that an adjustable float means is provided in connection with a storage tank diverting valve, which may be easily adjusted to operate the diverting valve at a predetermined liquid level. It will also be seen that means is provided which will prevent emulsifying of the oil, incident to the inrush of the oil during a filling operation and the clapper valves are carried by a single arm.

The invention having been set forth what is claimed as new and useful is:

1. The combination with a float controlled valve having a push rod controlled by a rockable float arm having a float thereon, one end of the float arm extending beyond its hinging point, of adjusting and actuating means for the rod, said means comprising a bell crank lever adjacent the rod, one arm of the bell crank lever being connected to the rod and an adjustable connection between one end of the float arm and the other arm of the bell crank, said adjustable connection comprising a rock shaft in the bell crank arm, a rock shaft in the end of the float arm, an adjustable screw rotatably mounted in one of said rock shafts, said adjustable screw being threaded transversely through the other rock shafts.

2. A diverting valve comprising a casing having angularly disposed valve seats, a single rock arm hingedly mounted between said seats, yieldably mounted clapper valves carried by the free end of said arm and cooperating with said seats oppositely extending arms carried by the free end of the arm, slidable and rockable connections between the clapper valves and the oppositely extending arms and leaf springs carried by opposite sides of the arm and engaging the inner sides of the clapper valves and yieldably forcing the same outwardly.

PHILLIPS B. DRANE.